Aug. 31, 1965   J. R. ALTIERI   3,203,633
PRECISION WINDING MACHINES AND APPARATUS
Filed Feb. 13, 1963   4 Sheets-Sheet 1

INVENTOR.
JOSEPH R. ALTIERI
BY
ATTORNEY

Aug. 31, 1965  J. R. ALTIERI  3,203,633
PRECISION WINDING MACHINES AND APPARATUS
Filed Feb. 13, 1963  4 Sheets-Sheet 2

INVENTOR.
JOSEPH R. ALTIERI
BY
ATTORNEY

Aug. 31, 1965  J. R. ALTIERI  3,203,633
PRECISION WINDING MACHINES AND APPARATUS
Filed Feb. 13, 1963  4 Sheets-Sheet 3
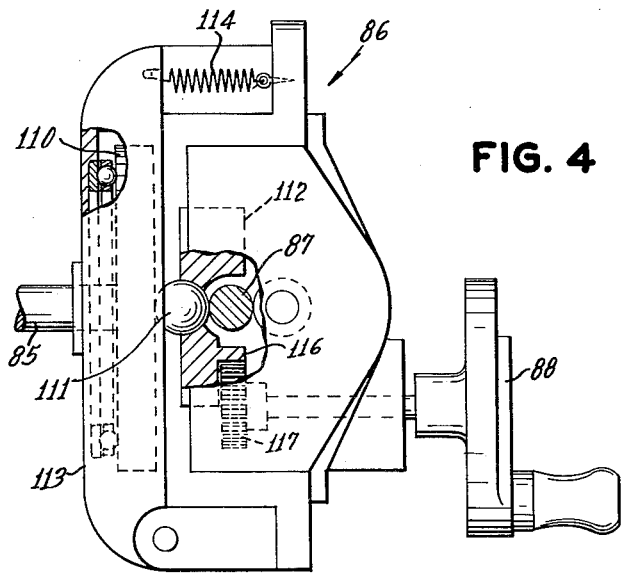
FIG. 4
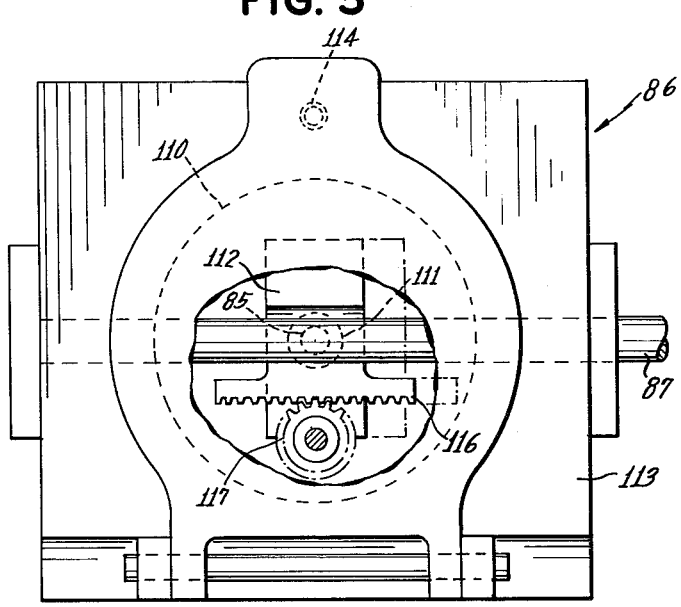
FIG. 5
INVENTOR.
JOSEPH R. ALTIERI
BY 
ATTORNEY Aug. 31, 1965        J. R. ALTIERI                3,203,633
            PRECISION WINDING MACHINES AND APPARATUS
Filed Feb. 13, 1963                                 4 Sheets-Sheet 4

INVENTOR.
JOSEPH R. ALTIERI
BY
ATTORNEY

United States Patent Office 3,203,633
Patented Aug. 31, 1965

3,203,633
PRECISION WINDING MACHINES AND APPARATUS
Joseph R. Altieri, Scarsdale, N.Y., assignor to Litton Industries, Inc., Beverly Hills, Calif.
Filed Feb. 13, 1963, Ser. No. 258,241
5 Claims. (Cl. 242—9)

This invention relates to precision winding machines and apparatus, more particularly to apparatus adapted to be employed in the manufacture of resistor elements used in potentiometer assemblies.

In apparatus of this character, resistance wire is helically wound on a winding form or mandrel which may consist of a fine insulated wire, such as enameled copper wire. Other support forms for the resistance wire may be used, such as an insulating strip or card. In order to obtain a resistor element having the desired resistance characteristic, either linear or non-linear within close tolerances, it is necessary to control the winding operation with great precision. This requires a continuous measurement of the varying resistance of the resistor element as the wire is wound on the winding form or mandrel, and accurate control of the feed or spacing of the turns of wire by control means including a reference standard or master potentiometer. As a practical matter, it is also important to provide apparatus which is simple to set up and operate, and which can be readily altered to produce resistor elements of different sizes and resistance characteristics.

It is an object of the invention to provide control apparatus for a winding machine of this character capable of producing resistor elements of precise resistance characteristics and enabling quantity production at reasonable cost.

Another object of the invention is to eliminate or minimize the inherent errors in the measurement of the resistance of the element being formed which have been encountered in the arrangements of the prior art.

Still another object of the invention is to provide a winding machine of the stated character which possesses enhanced reliability and ease of operation.

A more specific object of the invention is the provision, in the winding control unit of a resistor winding machine, of novel means for supplying current to the length of resistance wire wound on the mandrel or winding form and for deriving a comparison voltage, through an independent contact member, which represents the resistance of the wound portion of the resistance wire. It is found that in this manner, by suitably regulating the electrical parameters of the control circuits, the changing resistance of the element being wound may be continuously compared with that of the reference standard or master potentiometer with greater precision than could be realized with prior control apparatus.

With these and other objects in view, the invention as described herein is embodied in a resistor winding machine employing means for holding a mandrel or winding form and a conventional lead-screw arrangement for forming spaced turns of resistance wire on said mandrel, the wire being supplied from a supply spool, for example. Apparatus of this type is described in U.S. Letters Patent No. 2,989,256, granted June 20, 1961 to A. S. J. Lee and assigned to the same assignee as this application, the disclosure of said patent being incorporated herein by reference. In order to obtain the desired resistance characteristics in the resistor element, the resistance of the resistance wire that has been wound on the mandrel is compared continuously with the corresponding portion of a standard or master resistance element, and correction of the winding operation effected immediately upon any deviation from the desired resistance characteristic. Where this characteristic is the variation in resistance as a mathematical function of the contact movement, the correction may be made by varying the spacing of the turns of wire on the mandrel, which may be done by varying the feed in relation to the rotation of the mandrel. The speed and precision with which correction is accomplished are of the utmost importance.

The power drive for effecting relative rotational movement between the wire supply and the mandrel may be coupled to the lead-screw in such a manner that the drive ratio is changed to effect correction of the winding operation, as described for example in the above-mentioned Lee patent. In accordance with a feature of the invention, the means for measuring the exact resistance $Rx$ of the wound portion of the resistor being manufactured includes a contact member or members engaging the wire at the point where it is wound on the mandrel, and an independent current source for supplying current traversing the wire which has been wound on the mandrel. If the series current is maintained constant, the potential drop between the start end of the resistor and the point where the contact member bears on the resistance wire is directly proportional to the resistance $Rx$, and may be compared with the corresponding output voltage of the reference standard to control the winding operation.

Another feature of the invention relates to a novel means for generating the constant reference current which may be used in winding resistor elments of widely varying resistance.

Still another feature of the invention relates to means for obtaining an exact, adjustable drive for the movable contact of the standard or master potentiometer, so that the machine may be readily adjusted to wind elements of different lengths with the desired precision. As described by way of example, this variable drive mechanism includes a ball-and-disc type of variable-ratio drive mechanism which may be quickly adjusted as desired by the operator, the mechanism being so connected to the lead-screw or drive shaft as to minimize positional errors due to unavoidable slippage in the frictional drive elements of the variable-ratio device.

Other objects and advantages of the invention will be apparent from the following detailed description of the embodiment thereof shown in the accompanying drawings, wherein FIGS. 1 and 2 are plan and end elevations, respectively, of a portion of the carriage of the winding machine;

FIGS. 4 and 5 are front and side elevations of a manually adjustable drive unit forming part of the drive mechanism shown in FIG. 3;

Figure 1:
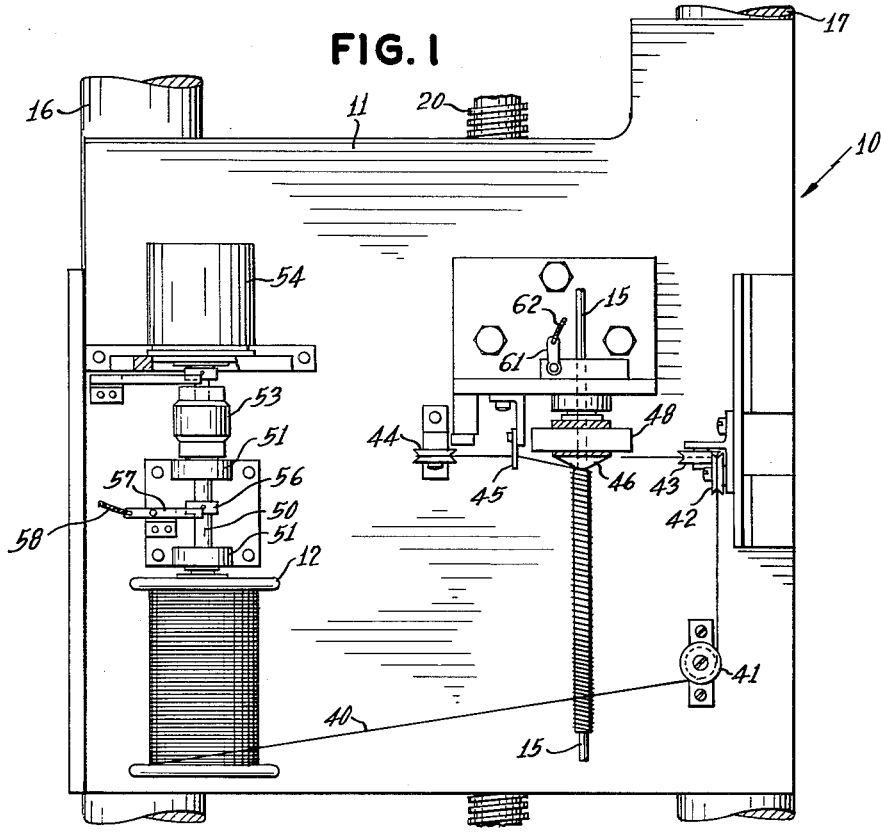
Figure 2:
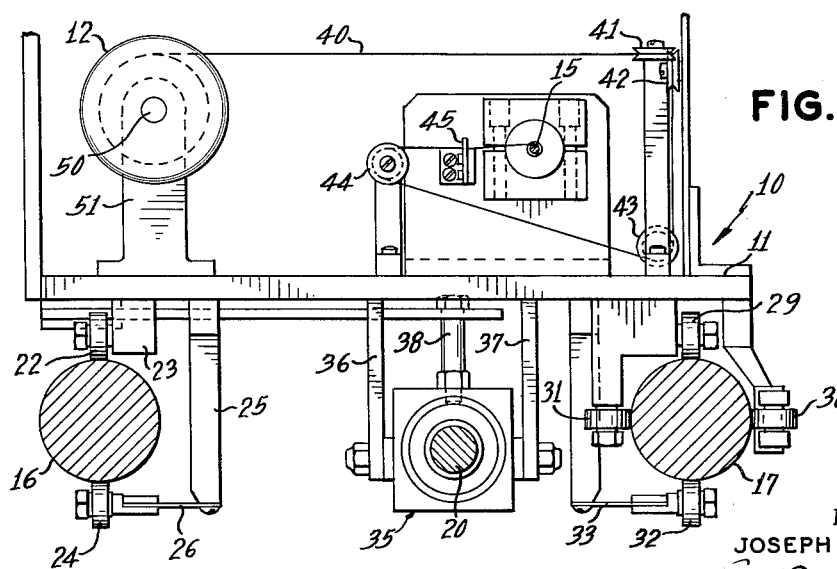
Figure 3:
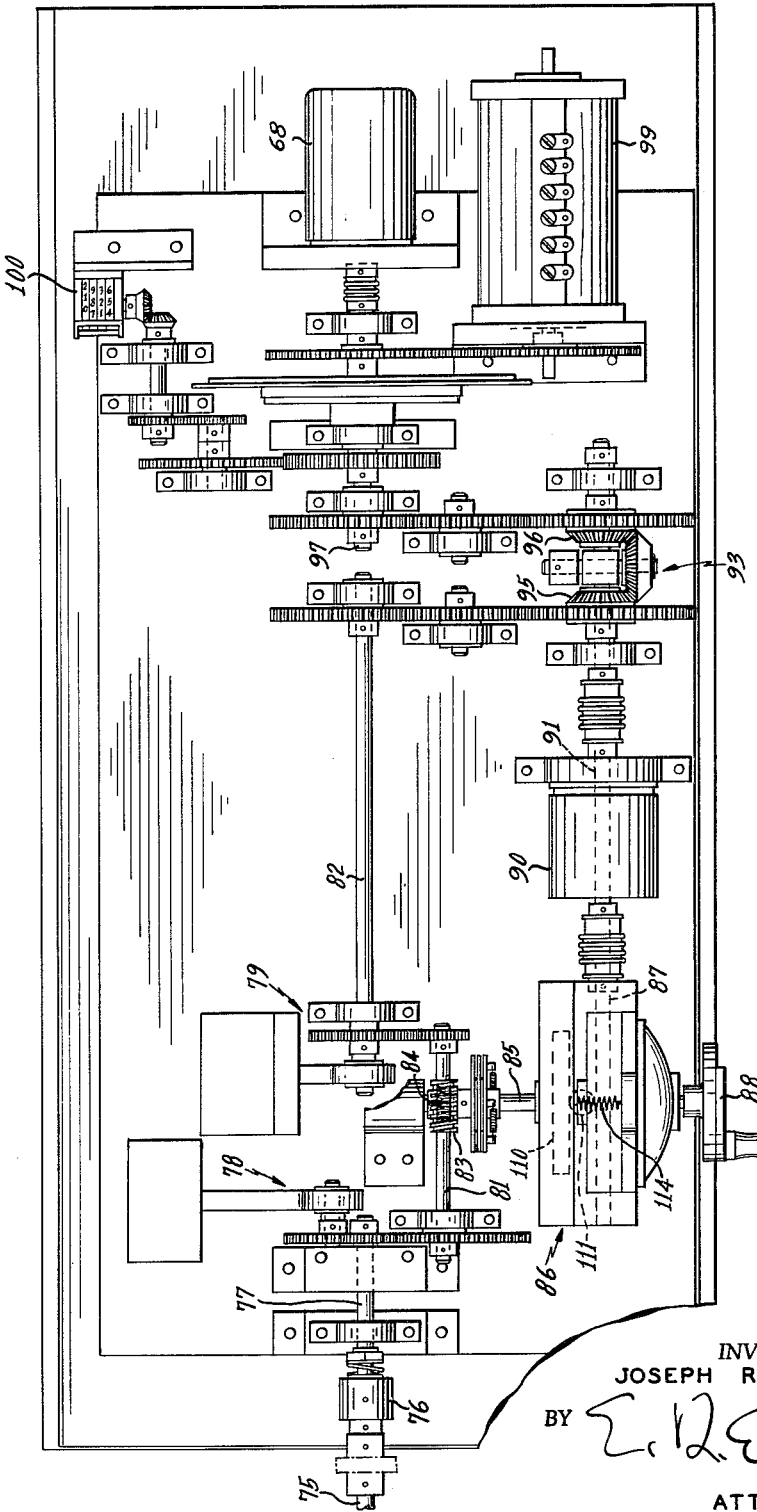
FIG. 3 is a plan view of the adjustable drive mechanism for a rotary standard or master potentiometer.

Referring to FIGS. 1 and 2 of the drawing, the precision winding machine embodying the invention includes a traveling carriage 10, comprising a horizontal base plate 11 on which are supported a spool of resistance wire 12 and suitable wire guiding means in cooperative relation to an insulated mandrel 15 on which the resistance wire is wound. Since the general construction of the winding machine corresponds to that shown in the above-mentioned Lee patent, parts of the complete machine have been omitted for the sake of clarity. The carriage 10 is supported in any suitable manner for transverse movement on two parallel guide rails 16 and 17, the carriage being fed in the direction of the axis of the mandrel 15 by a lead-screw 20. Since the rate of feed of the carriage 10 is proportional to the rotation of the lead-screw 20, the spacing of the resistance wire on the mandrel 15 is dependent upon the rotative speed of the lead-screw.

As shown, the left hand side of the traveling carriage 10 is supported by a ball bearing wheel or roller 22 supported on a rigid lug 23 attached to the underside of the base plate 11. A similar wheel or roller 24 is mounted on a second bracket or lug 25 and engages the underside of the guide rail 16. The roller 24 is shown as mounted on a flexible leaf spring 26 which is removably attached to the lug 25 in any suitable manner, as by a threaded screw or bolt. At the right hand side of the carriage, two sets of guide wheels or rollers are provided for holding the traveling carriage 10 in alignment with the lead-screw 20. The two sets of rollers are spaced apart along the length of the guide rail 17, only one being shown in FIG. 2. As shown, each set of guide rollers comprises three rigidly mounted rotatable rollers 29, 30 and 31 engaging the top and sides of the guide rail 17, and a lower rotatable wheel or roller 32 engaging the bottom of the guide rail 17. The lower bearing or roller 32 may be mounted on a detachable leaf spring 33 in a manner similar to that shown for the member 24 on the left hand side guide. A split-nut assembly 35 engaging the lead-screw 20 is mounted on the posts 36 and 37 attached to the underside of the base plate 11. The split-nut assembly 35 is adapted to be actuated to release the carriage from the lead-screw by operation of a rod 38 in the conventional manner.

By way of illustration, the winding operation is effected by rotating the mandrel 15 and guiding the resistance wire 40 from the spool 12 onto the surface of the mandrel substantially as described in the above-mentioned Lee patent. During the winding operation, the resistance wire 40 is unwound from the spool 12 and passes over guide pulleys 42, 43 and 44, the guide bar 45 and against the tip end of the nose piece 46 which lies adjacent the convolution of the wire being wound on the mandrel 15. The nose piece 46 is part of a hollow mandrel guide 48 embracing the rotating mandrel 15, and serves to accurately position the wire in relation to the winding form or mandrel. The turns or convolutions of the wire 40 on the mandrel 15 may vary in spacing as shown, the spacing being controlled by the relation between the rotative speed of the mandrel 15 and the feed rate of the carriage 10, as pointed out above. The nose piece 46 also provides electrical contact with the wire 40.

The wire spool 12 is clamped to a rotatable spool shaft 50 which is supported in upright bearing members 51 on the base plate 11. The inner end of the spool staft 50 is connected through an insulating coupling 53 to the shaft of a tension motor 54 arranged to impose a constant but adjustable tension upon the wire 40. The motor 54 may be any conventional electric motor which may be regulated by varying the excitation thereof to control the shaft torque. The wire spool 12 being of metal is in electrically conducting relation to the metal shaft 50. A metallic disc or slip ring 56 is secured to the shaft 50, and a brush 57 bearing on the slip ring 56 provides metallic contact with said slip ring, thus connecting a wire 58 in circuit with the resistance wire 40 being wound on the mandrel 15. A similar conductive connection is made to the start end of the winding on the mandrel as shown in FIG. 6 by a slip ring 59 and brush 60, so that a source of current can be connected to the ends of the resistance wire 40 during the winding operation for a purpose to be described.

In accordance with one feature of the invention, a contact is provided for engaging the wire 40 which is independent of the current supply to the resistance wire and which is used for measuring continuously the resistance $Rx$ of the wound portion of the resistor being manufactured. The nose piece 46 and, if desired a contact 47 (see FIG. 6) may be used for this purpose and since the point of contact is independent of and between the point of current injection and the winding, the electrical voltage measurement across the wound portion of the resistor is not affected by variations in the current flow through the contact, as would be the case where the same contact is used to supply current to the resistance wire. As shown the contact comprising the nose piece 46 is electrically connected to a terminal lug 61 and conductor 62 forming part of a circuit for controlling the servo motor drive for the carriage and rotating mandrel 15. A typical control circuit is shown in FIG. 6.

Figure 6:
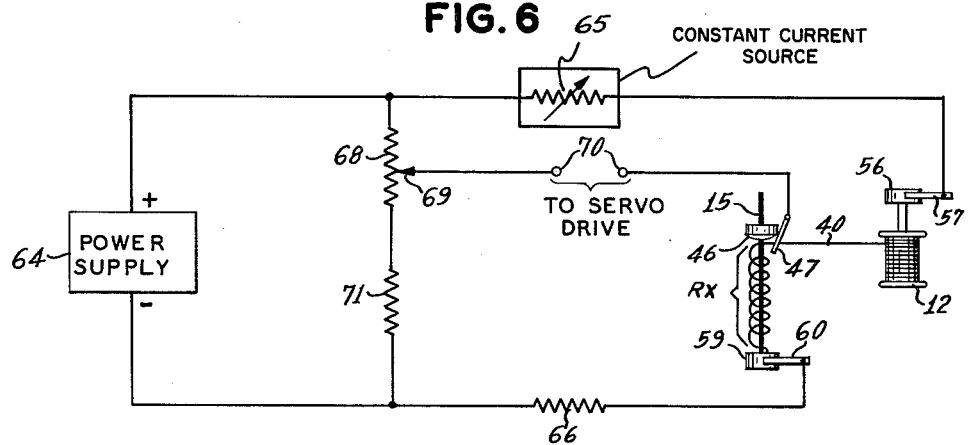
FIG. 6 is a schematic circuit diagram of the system according to the invention for measuring continuously the resistance $Rx$ of the resistance element as it is wound, and controlling servo drive means for regulating the carriage feed.

The electrical control circuit shown in FIG. 6, embodying features of the invention, comprises a regulated constant-voltage power supply 64 connected through amplifier 65, represented as a variable resistor. This amplifier may be a conventional D.C. differential input, high impedance, high gain amplifier having an output voltage proportional to the ratio of feedback resistance to output resistance which is effective to provide a constant current output through the circuit including the wire spool 12, and the resistance wire 40 between the spool and the start terminal of the resistor element being wound. An auxiliary resistor 66 may also be inserted in this circuit if required for balancing the control bridge. Since the current through the resistance wire being wound is constant, the potential drop across the wound portion of the resistance element is directly proportional to the resistance $Rx$ of this portion of the resistance element during the entire manufacturing process. A master or standard potentiometer 68, which is used to control the characteristics of the potentiometer being manufactured, is provided with a movable contact 69 which is coupled to the drive for the lead-screw 20 as described below in connection with FIGS. 3, 4, 5 and 7. Thus the circuit provides for comparison between the resistance $Rx$ of the resistor being wound and the corresponding part of the master or reference resistor 68. The terminals 70 of the servo amplifier input are shown as connected to the nose piece 46 and contact 47, and the contact 69 of the reference or master potentiometer. The circuits and mechanical arrangement of the servo motor drive may be similar to those described in the above-mentioned Lee patent.

A compensating resistor 71 may be connected in series relation with the master potentiometer 68 to provide the desired response characteristics of the servo motor drive and for balancing the resistance of the "overtravel" section at the end of the resistor element being wound.

For different resistor characteristics, another suitable master potentiometer or a tapped master with shunting resistors or potentiometers is substituted for the potentiometer 68. The same reference potentiometer however may be employed for manufacturing resistor elements of the same linear or non-linear taper of various ranges or physical lengths, by varying the ratio between the winding machine drive and the drive for the master potentiometer contact 69. In any case, the precise measurement of the resistance $Rx$ according to the invention enhances the accuracy of the resistor-forming operation.

FIGS. 3, 4, 5 and 7 illustrate a novel drive system for the reference potentiometer contact 69, which facilitates adjustment of the drive ratio to apply the proper scale factor to the travel of the adjustable contact member 69, and minimizes error due to slippage in the manually adjustable friction drive unit used to obtain a precise ratio. The drive mechanism may be mounted in any convenient location wtih respect to the movable carriage 10 and comprises a main drive shaft 75 which is connected for example to the lead-screw 20 or a shaft synchronized with the lead-screw. The drive shaft 75 is connected through a friction slip clutch 76 to a jack shaft 77 connected to the first of two ratio change gear drives 78 and 79 provided with replaceable gears for setting approximately the length of the potentiometer element to be wound on the winding machine. The output torque of the ratio change unit 78 is connected to a shaft 81 which drives shaft 82 through the drive unit 79. The shaft 81 is further provided with a worm 83 engaging the worm gear 84 mounted on the input shaft 85 of an adjustable speed changing unit 86. The speed changing unit 86, which is shown in detail in FIGS. 4 and 5, is preferably of the ball and disc type, and the speed ratio drive between the input shaft 85 and the output shaft 87 is manually controlled by hand wheel 88. A gear reduction unit 90 is preferably connected between the shaft 87 and the shaft 91 which in turn is connected to the ring gear of differential gear mechanism 93. The coaxial gears 95 and 96 of the differential gear mechanism 93 are connected through the gearing arrangement shown to the shafts 82 and 97 respectively. The output shaft 97 is coupled to the master potentiometer 68 and to a reverse torquing servo motor 99. The purpose of servo motor 99 is to eliminate the backlash in the gearing. A counter 100 is provided for registering the number of revolutions of the drive shaft 97, and of the shaft of the master potentiometer 68.

The construction of a preferred form of ball and disc speed changer 86 is shown in FIGS. 4 and 5. The speed changer or variable ratio drive unit comprises a disc 110 on the end of the shaft 85. A steel ball 111 is mounted in frictional contact with the face of the disc 110 and with the periphery of the output shaft 87. The ball 111 is rotatably mounted in a movable carrier element 112 so that it may be moved along the avis of the shaft 87 into or out of the position where it is aligned with the axis of the shaft 85. When the ball 111 is moved away from the axis of the shaft 85, it is turned by the rotation of the disc 110 at a rate proportional to the distance from the axis of the shaft and correspondingly rotates the output shaft 87. The disc 110 is mounted in a bearing carried by the hinged plate 113 which is connected at its upper end to a tension spring 114 to maintain predetermined pressure between the disc 110 and the ball 111. In order to adjust the position of the ball 111 with respect to the rotating disc 110, the movable carrier element 112 is provided with a toothed rack 116, as shown in FIG. 5, said rack being engaged by a pinion 117 attached to the shaft of the hand wheel 88. Any other suitable form of variable ratio drive mechanism which provides for accurate and minute adjustment of the drive ratio may be employed in lieu of that shown.

Figure 7:
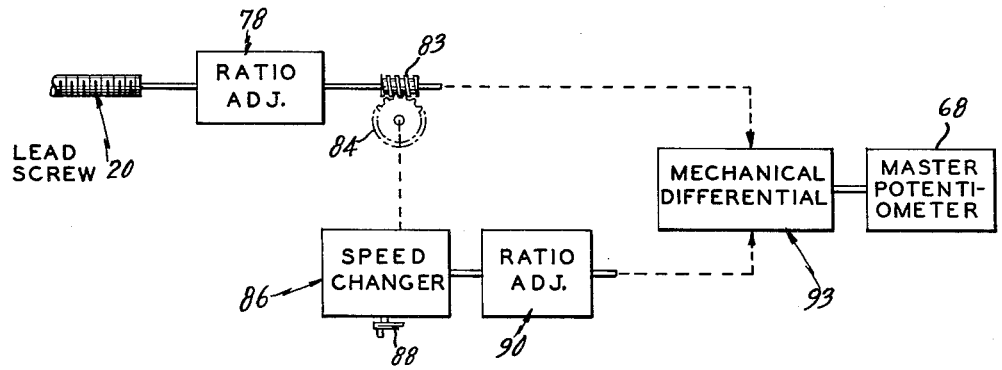
FIG. 7 is a diagram, partially schematic, representing in simplified form the adjustable drive system shown in FIG. 3.

The principal elements of the mechanism for driving the master potentiometer as required for potentiometer resistance elements of differing lengths and characteristics are shown diagrammatically in FIG. 7 in order to bring out the function of the various elements in a simple and readily understood manner.

In the manufacture of precision potentiometers, it is necessary to be able to make or wind resistance elements of various predetermined lengths and the length held to an exact value in each case. Comparatively large length differences are needed for components of various physical diameters and/or different number of helical turns for multiturn units of the same diameter. Small changes in length are also necessary to compensate for variations in the size of the winding mandrel, and variations in the diameter of the resistance wire, as the length along the wiper surface must be equal to the specified design value within a very close tolerance.

The ratio change gear units 78 and 79 provide for large ratio changes, and therefore large length changes in the potentiometer element. The continuously adjustable ratio change mechanism 86 provides a simple and effective vernier adjustment, interpolating between the fixed ratio changes, and resulting in an exact final setting to obtain exactly the length required. Since the output of unit 86 is differentially connected with the main shaft 82 through gear reduction 90 and its input through the worm drive 83, 84, any slippage or lack of fidelity in the transmission through the ratio change unit 86 is reduced in proportion to the drive ratios thereof, and hence is negligibly small in the output shaft motion.

While a specific embodiment of the invention has been described in detail in order to explain the underlying principles thereof, it will be understood that the invention is not limited thereto since alterations and modifications in both the structure and the electrical circuits will readily suggest themselves to persons skilled in the art without departing from the spirit or scope of the invention.

What is claimed is:

1. A resistor winding machine comprising, in combination,
   a winding form or mandrel on which resistance wire is to be wound,
   means for winding turns of wire on said form or mandrel,
   means for supplying constant current traversing the length of the turns of wire wound on said winding form or mandrel during the winding operation,
   means for continuously measuring the voltage drop in said length of wire, proportional to its resistance, and
   means controlled by said measuring means for varying the spacing of the turns of wire on said winding form or mandrel.

2. A resistor winding machine comprising, in combination,
   an insulating support or mandrel on which resistance wire is to be wound,
   means for winding turns of wire on said support or mandrel, said means including wire-guiding means adjacent said support or mandrel,
   means for supplying constant current to the length of wire wound on said support or mandrel, and
   means independent of said current-supply means to compare the resistance of the wound section of resistance wire with a standard, including a contact engaging said wire adjacent said wire-guiding means.

3. A resistor winding machine comprising, in combination,
   means for winding resistance wire with controlled spacing between turns,
   driving means therefor,
   means for supplying constant current traversing the length of wire being formed by said winding means,
   means for comparing the potential drop proportional to the resistance of the wound portion of said resistor with the desired value to detect any deviation in the resistance characteristic during winding, and
   means for correcting the resistance characteristic in response to such deviation, controlled by said comparing means.

4. A resistor winding machine comprising, in combination,
   an insulating support or mandrel on which resistance wire is to be wound,
   wire feeding means,
   means for effecting relative rotation and longitudinal feed between said support or mandrel and said wire feeding means to wind the wire in spaced turns on said support or mandrel,
   means for regulating the relative feed of the wire to obtain desired resistance characteristics in the completed resistor, and
   means for controlling said regulating means during the winding of the wire on said support or mandrel, including means for maintaining a uniform, constant flow of current through the portion of the wire wound on said support or mandrel, means for measuring the potential drop across the wound portion of wire and means for continuously comparing said potential with a reference potential.

5. A resistor winding machine comprising, in combination,
   a mandrel, power driven means for winding turns of resistance wire on said mandrel, means including a rotatable feed screw for spacing said turns of wire, means for supplying constant current to the wire as it is being wound, means for measuring the voltage drop across the wound portion of the resistor, a reference standard or master potentiometer having the resistance characteristic desired in the resistor being wound, and provided with an adjustable contact member, means including said measuring means and said reference standard or master potentiometer for controlling the spacing between the turns of wire on said mandrel, and means for applying a scale factor to the travel of the reference standard or master potentiometer to establish the desired relationship between the total travel of the adjustable contact member of the standard or master potentiometer and the total travel of the resistor being wound, said last-mentioned means including rotary drive mechanism having a driven input shaft connected to or synchronized with said rotatable feed screw, and an output shaft connected to said adjustable contact member of the standard or master potentiometer, and a manually adjustable speed changer for adjustable geared-down ratio drive connected to the input shaft of said rotary drive mechanism, and a fixed ratio drive between said power driven means and said adjustable contact member, said adjustable and fixed ratio drives being differentially connected to said output shaft driving the adjustable contact member of said reference standard or master potentiometer.

References Cited by the Examiner
UNITED STATES PATENTS

| | | | |
|---|---|---|---|
| 2,319,413 | 5/43 | Leathers et al. | 242—9 X |
| 2,643,068 | 6/53 | Harris | 242—9 |
| 2,725,199 | 11/55 | Bower. | |
| 2,989,256 | 6/61 | Lee | 242—9 |

MERVIN STEIN, *Primary Examiner.*

RUSSELL C. MADER, *Examiner.*